(No Model.)
A. M. G. SÉBILLOT.
GALVANIC BATTERY.
No. 253,769. Patented Feb. 14, 1882.
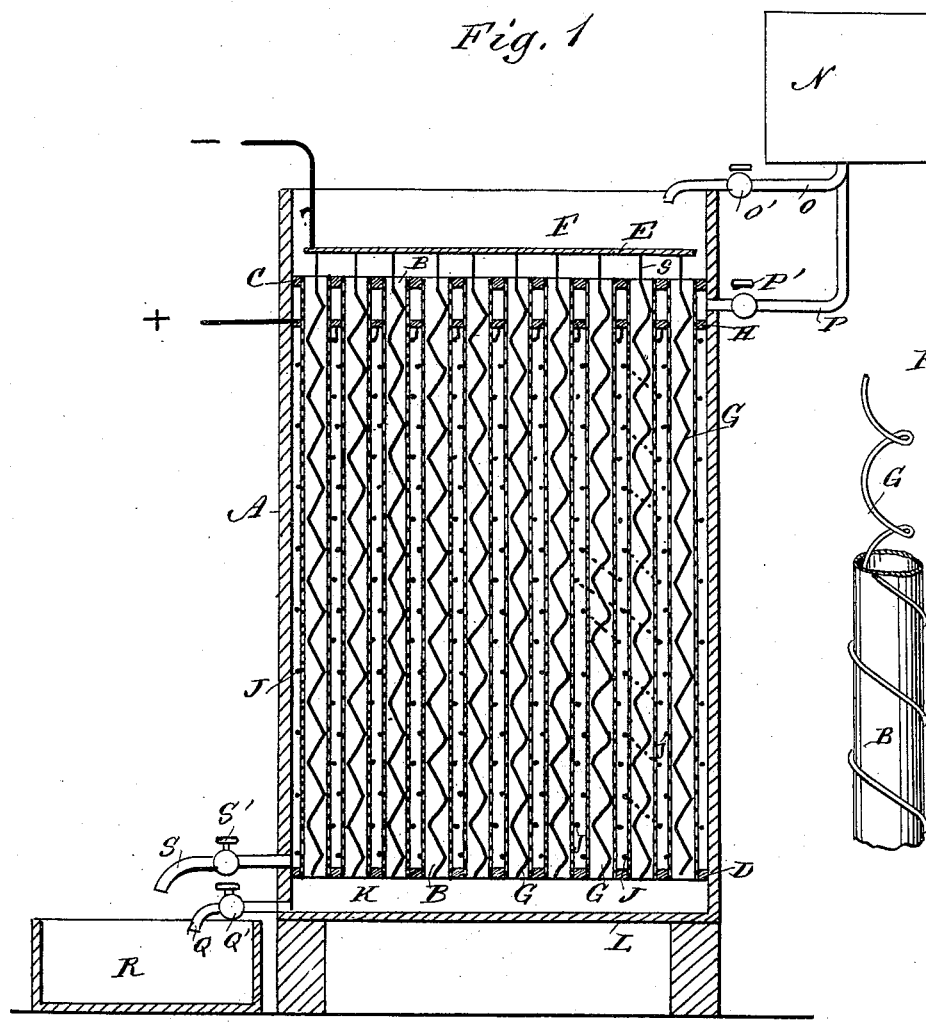
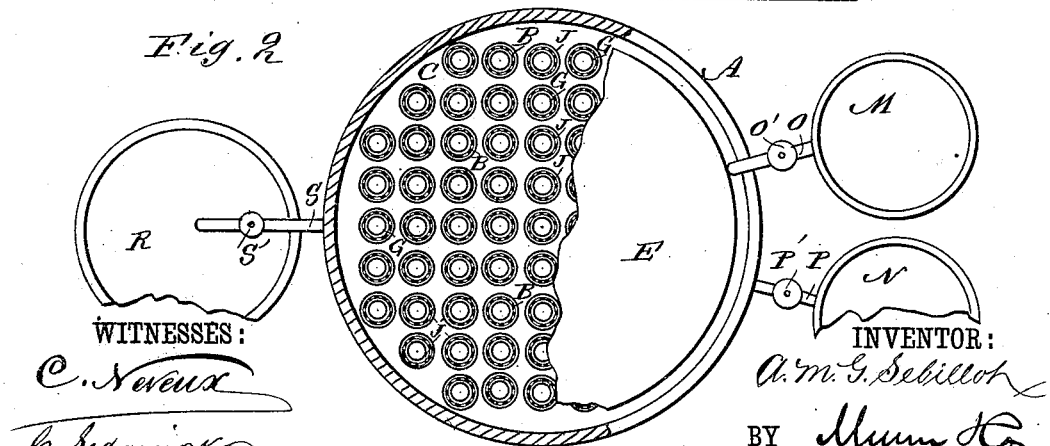
WITNESSES:
C. Neveux
C. Sedgwick
INVENTOR:
A. M. G. Sébillot
BY Munn & Co.
ATTORNEYS.

UNITED STATES PATENT OFFICE.

AMÉDÉE M. G. SÉBILLOT, OF DENVER, COLORADO.

GALVANIC BATTERY.

SPECIFICATION forming part of Letters Patent No. 253,769, dated February 14, 1882.

Application filed November 18, 1881. (No model.)

*To all whom it may concern:*

Be it known that I, AMÉDÉE M. G. SÉBILLOT, of Denver, in the county of Arapahoe and State of Colorado, have invented a new and Improved Galvanic Battery, of which the following is a full, clear, and exact description.

The object of my invention is to provide a new and improved apparatus for generating electricity by the action of chemicals on each other.

The invention consists in a vessel made of non-conducting material and provided with a series of porous vertical tubes arranged between the top and bottom of the vessel, each of which tubes contains and is surrounded by a spiral wire, all the external spiral wires being connected with a metal plate and all the internal spiral wires being connected with another metal plate. Two different chemical solutions, which, when combined, produce a salt, flow down the porous tubes, in which they combine, one solution flowing down on the inside of the tubes and the other on the outside. By the chemical combination electricity is produced, which is conducted by the spiral wires to the plate, the wires only acting as conductors, and are not decomposed or consumed.

Reference is to be had to the accompanying drawings, forming a part of this specification, in which similar letters of reference indicate corresponding parts in all the figures.

Figure 1 is a cross-sectional elevation of my new and improved electric generator. Fig. 2 is a plan view of the same. Fig. 3 is a detail perspective view of one of the porous tubes containing a spiral wire and surrounded by a spiral wire.

The cylinder A or other suitable vessel, made of wood or any other non-conductive material, is provided with a series of vertical tubes, B, of porous porcelain, earthenware, canvas, or any other suitable porous material through which liquids will slowly percolate, these tubes extending from the upper horizontal or transverse partition, C, of the cylinder to the bottom horizontal transverse partition, D, these partitions being provided with apertures to receive the ends of these tubes B.

A copper or platinum plate, E, which, if desired, may be provided with a series of small apertures, is contained in the tank F, formed at the top of the cylinder A, and this plate E is located a short distance above the upper horizontal partition, C. From this plate E spiral copper or platinum wires G pass down through the tubes B, on the inside of the same. A like metal plate, H, is arranged a short distance below the upper horizontal partition, C, the tubes B passing through this plate H, from which copper or platinum wires J are suspended, which are coiled around the outer sides of the tubes B.

A tank or reservoir, K, is formed between the bottom horizontal partition D and the bottom L of the cylinder A.

Two tanks, M and N, are provided for the solutions for generating the electricity, and a pipe, O, provided with a stop-cock, O′, conducts the contents of the tank M upon the plate E in the tank or reservoir F on the top of the cylinder A, and a pipe, P, with a stop-cock, P′, conducts the contents of the tank N upon the metal plate H between the top and bottom horizontal partitions, C and D, and a short distance below the former. A pipe, Q, provided with a stop-cock, Q′, conducts the liquid in the tank K into a collecting-vessel, R, and a pipe, S, provided with a stop-cock, S′, conducts the liquid collecting on the bottom horizontal partition, D, into the collecting-vessel R. The liquid flowing on the plate E will flow down on the insides of the tubes B, and the liquid flowing on the plate H will flow down on the outsides of the tubes. The height of the cylinder, the diameters of the tubes B and their porosity, the speed of flowing, &c., must all be so adjusted that the mixture of the solutions or liquids which takes place in the porous tubes is complete when they reach the bottoms of the tubes, and all the electro-motive power possible has been produced by the combination of the two solutions. For instance, if the tank M contains sulphuric acid and the tank N ammonia solution, a solution of sulphate of ammonia will flow from the pipes S and Q, and the electro-motive power produced by the combination of these two chemicals will be conducted by the wires G and J to the plates E and H. If nitric acid and potash solution are in the tanks M N, nitrate of potash will be collected in the vessel R, and electricity is also produced by the combination of these two chemicals.

An apparatus of this kind furnishes a continual current of electricity, and the apparatus can be built of any desired size. The metals simply act as conductors, and are not consumed, and the cost of producing electricity is only that of the chemicals used, from which cost, however, the value of the product must be deducted, which is often greater than that of the chemicals originally used, thus making the apparatus a most economical source of electricity.

In place of the tubes B, equivalent devices may be used. One tank—for instance, M—must contain an acid, and the other—N, for instance—must contain a base in solution. When united or combined in the tubes B a salt in solution is produced, and this combination of chemicals produces electricity.

Having thus described my invention, I claim as new and desire to secure by Letters Patent—

1. An electric generator made substantially as herein shown and described, and consisting of a vessel containing a series of porous tubes for mixing two chemicals flowing down the surfaces of the same, which tubes contain and are surrounded by conducting-wires for conducting the electricity produced to collecting-plates, as set forth.

2. In an electric generator, the combination, with the cylinder A, of the porous tubes B, the internal spiral wires, G, and the external spiral wires, J, substantially as herein shown and described, and for the purpose set forth.

3. In an electric generator, the combination, with the cylinder A, having a tank, F, at the top and a tank, K, at the bottom, of the porous tubes B and the spiral wires G and J, substantially as herein shown and described, and for the purpose set forth.

4. In an electric generator, the combination, with the cylinder A, of the porous tubes B, the spiral wires G and J, and the metal plates E and H, substantially as herein shown and described, and for the purpose set forth.

5. In an electric generator, the combination, with the cylinder A, of the porous tubes B, the spiral wires G and J, the metal plates E and H, and the tanks M and N for containing the chemical solutions, substantially as herein shown and described, and for the purpose set forth.

AMÉDÉE M. G. SÉBILLOT.

Witnesses:
 EM. TOLLY,
 E. DURCK.